Jan. 2, 1940.  K. R. BLAKE ET AL  2,185,799

LIQUID COOLING MEANS AND CONTAINER THEREFOR

Filed Dec. 8, 1938

INVENTORS
Kenneth R. Blake
Albert L. Bunting
BY Windsor Davis
ATTORNEY.

Patented Jan. 2, 1940

2,185,799

UNITED STATES PATENT OFFICE 2,185,799

LIQUID COOLING MEANS AND CONTAINER THEREFOR

Kenneth R. Blake, Grosse Pointe, and Albert L. Bunting, Detroit, Mich.

Application December 8, 1938, Serial No. 244,656

3 Claims. (Cl. 62—94)

This invention relates to a method and means of cooling liquids confined in containers and has for its object to provide means for conveniently and attractively cooling such liquids as beer and other bottled goods together with a container which lends itself particularly to the employment of this method.

There are many occasions when it is not possible or convenient to obtain the use of refrigerators for cooling liquids. In all such cases among which may be mentioned an over-crowded refrigerator in expectancy of a large number of guests, when attending picnics and other outings, when taking long trips and the like, it is a material advantage to be able to provide independent means, usable or operative when the occasion arises for cooling either a small or large amount of beverages with a minimum of trouble and time. It is, therefore, the object of this invention to provide means operative with small trouble to cool individual containers in a short time and without expert knowledge.

More particularly, it is an object to provide a chemical means which can be supplied at comparatively small cost and which can be utilized in small quantities to reduce the temperature of a liquid merely by the addition of some readily obtainable chemical, preferably water, thereto and which will be entirely safe to handle by the general public.

Another object is to provide a compartmented container having space for the liquid to be cooled and a further space or spaces into which the chemical capable of effecting cooling may be placed, the latter space or spaces being capable of manual opening for the purpose of introducing water therein by which the chemical action capable of causing the reduction in temperature is instigated.

In carrying my invention into effect I prefer to use ammonium or potassium salts capable of absorbing heat upon solution with water. Among the various inorganic salts which will absorb heat upon solution with water are the following: ammonium chloride, ammonium nitrate or nitrite, potassium nitrate or nitrite, also a second group including hydrated salts such as sodium sulphate, ammonium oxylate, sodium tetrachlorate and sodium carbonate. Of these the ammonium and potassium salts are preferable because of their lower cost and their use of relatively small quantities of water to carry them into solution. As an example of the preferred formula for cooling twelve ounces of liquid such as beer, the following is recommended: 150 grams of ammonium nitrate ($NH_4NO_3$) will dissolve in 120 grams of water and will reduce the temperature of the liquid when in a suitable container from 74° F. to 7° F. in between three and four minutes. Since ample water should be used to assure a maximum reaction of the salts we, therefore, recommend substantially equal parts by weight of water and salts.

A suitable type of container is illustrated in the accompanying drawing wherein.

More particularly I indicates a container made of metal, wax paper or other material suitable for the purpose. This container has a top 2 adapted to be pierced by a can-opener or opened in any special or well-known manner. The bottom 3 is pressed well into the body part I and is preferably of generally conical shape in order to expose a large area to the contents in the container. A second bottom, or in reality a top 4 for the conical compartment is provided, a removable cap 5 being provided for purposes of filling. This compartment is filled with ammonium or potassium salts as previously described, the main compartment being filled with beer or other beverage or liquid to be cooled. The container is then ready for marketing, a customer being instructed to remove the cap 5 and introduce a stated amount of water. The amount of water to be added can be expressed in terms of fillings of the cap 5. When water is introduced the container should be allowed several minutes to cool before opening the main compartment for the use of its contents.

Figure 3:
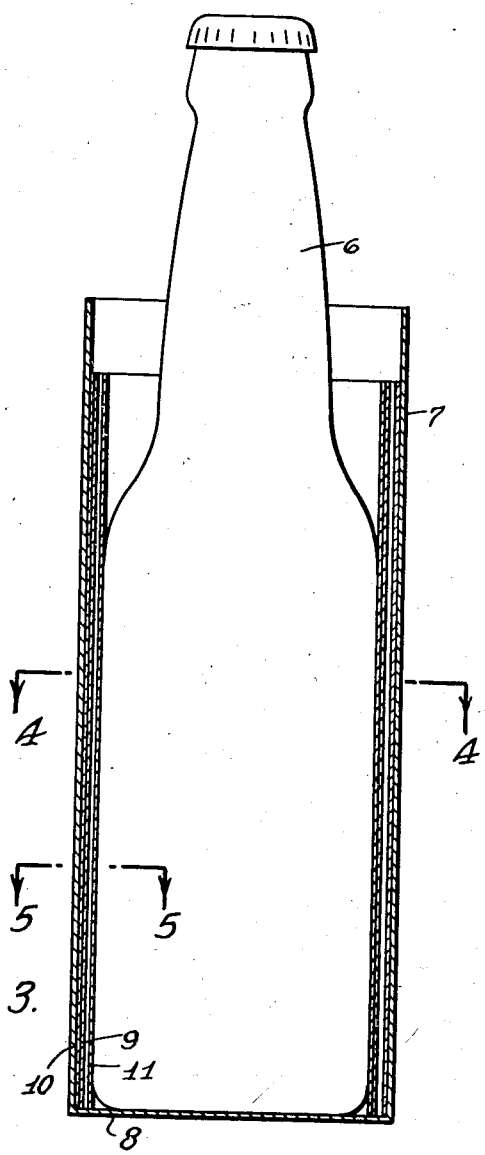
Fig. 3 is a longitudinal diametric section through a modified form of container with a bottle positioned therein.
Figure 4:
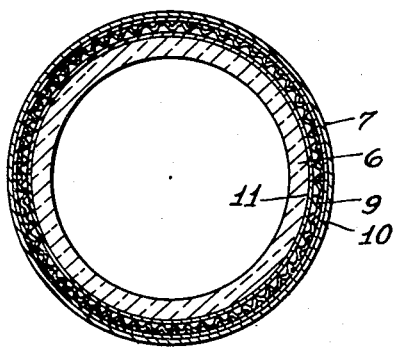
Fig. 4 is a transverse section taken along the line 4—4 of Fig. 3.
Figure 5:
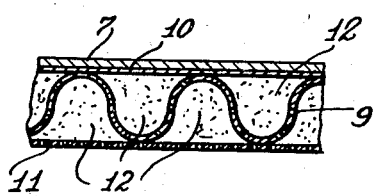
Fig. 5 is an enlarged detail section through the container of Fig. 3.

In Figs. 3 and 4 a bottle 6 is illustrated which may be a beer or soft drink container of any special or conventional shape. The bottle is enclosed by a dual container 7 composed of a moisture proof material, such as wax paper or a cellulose acetate sheet or the like, made in the form of a bag and having a bottom 8 against which the bottom of the bottle rests. Inside this bag is a liner of corrugated paper composed of an undulating ribbon 9 and outside walls 10 and 11, the ribbon and the inside wall 11 being perforated at a multiplicity of points. The spaces 12 defined by the ribbon and walls are filled with ammonium or potassium salts, as previously described. The liner for the bag or container 7 need not and preferably does not extend throughout the entire length of the container since the top of the bag may be used to retain the salts in place. Or the top of the liner may be sealed by a glue or other suitable means in order to prevent loss of the salts from the spaces in the liner. When the container is removed from storage and a bottle placed therein or, if the container is sold with a bottle therein as a single package, water may be added simply by flowing it over the neck of the bottle whereupon it will find its way into contact with all of the salts with a reduction in temperature as previously described. The container is so proportioned as to hold an adequate amount of water for a maximum chemical reaction without a superabundance of water.

Figure 1:
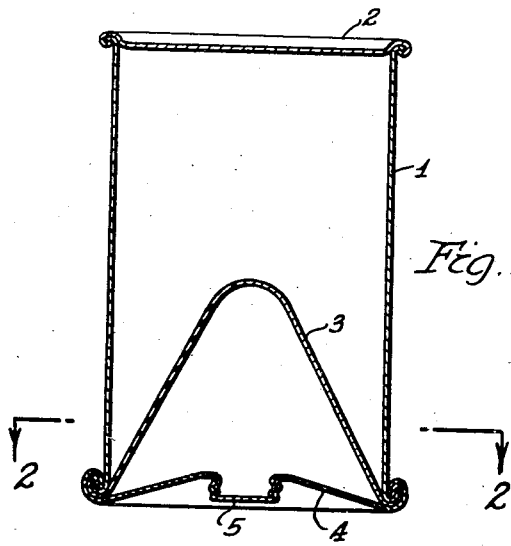
Fig. 1 is a longitudinal, diametric section through a container.
Figure 2:
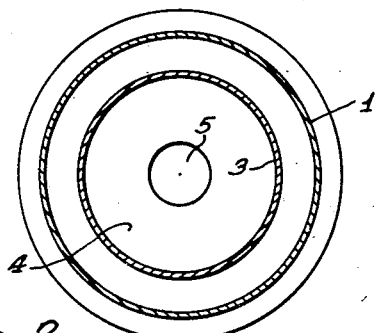
Fig. 2 is a transverse diametric section along the line 2—2 of Fig. 1.

It will be obvious to one skilled in the art that numerous type and shape containers can be constructed either to contain the salts en masse as in Fig. 1 or to be interspersed or otherwise incorporated in the container as illustrated in Fig. 3 and I therefore desire to be extended protection as defined by the scope of the appended claims.

What is claimed is:

1. A liquid cooler means comprising a water proof container for a liquid receptacle having a liner therein of cellular structure and salts of ammonium or potassium incorporated in said liner, said salts being sealed against loss from said liner.

2. A liquid cooling means comprising a container of corrugated material with sheet material secured to each side thereof, said corrugated material and said sheet material on one side of said corrugated material being perforated at a plurality of points, the interstices between said material and said sheets being filled with a chemical which absorbs heat when dissolved in water.

3. A liquid cooling means composed of a bag of water resistant material, a cylindrical liner for said bag composed of a corrugated ribbon having sheets secured to the nodes of the corrugations on each side of said ribbon, the interstices between said ribbon and said sheets being filled with salts of ammonium, said bag extending upwardly beyond said liner whereby it can be folded downwardly over the edges thereof.

KENNETH R. BLAKE.
ALBERT L. BUNTING.